F. SIEGLINGER.
COTTON CHOPPER.
APPLICATION FILED MAY 12, 1910.

994,343.

Patented June 6, 1911.

Witnesses:
F. C. Valentine
A. C. Otters

Inventor:
Fred Sieglinger
by Fred D. Tillman
Attorney.

UNITED STATES PATENT OFFICE.

FRED SIEGLINGER, OF LONE WOLF, OKLAHOMA.

COTTON-CHOPPER.

994,343.
Specification of Letters Patent.
Patented June 6, 1911.

Application filed May 12, 1910. Serial No. 560,781.

*To all whom it may concern:*

Be it known that I, FRED SIEGLINGER, a citizen of the United States, residing at Lone Wolf, in the county of Kiowa and State of Oklahoma, have invented certain new and useful Improvements in Cotton-Choppers, of which the following is a specification.

My invention relates to improvements in cotton choppers, the primary object of the invention being to provide a generally improved device of this class of simple, cheap, and efficient construction which may be readily and quickly attached to or detached from a suitable wheeled vehicle such as a cultivator, without in any way interfering with the functions and operations of the latter.

With the above mentioned ends in view, the invention consists in the novel construction, arrangement, and combination of parts, hereinafter described, illustrated in one of its embodiments in the accompanying drawings, and particularly pointed out in the appended claim.

Figure 1:
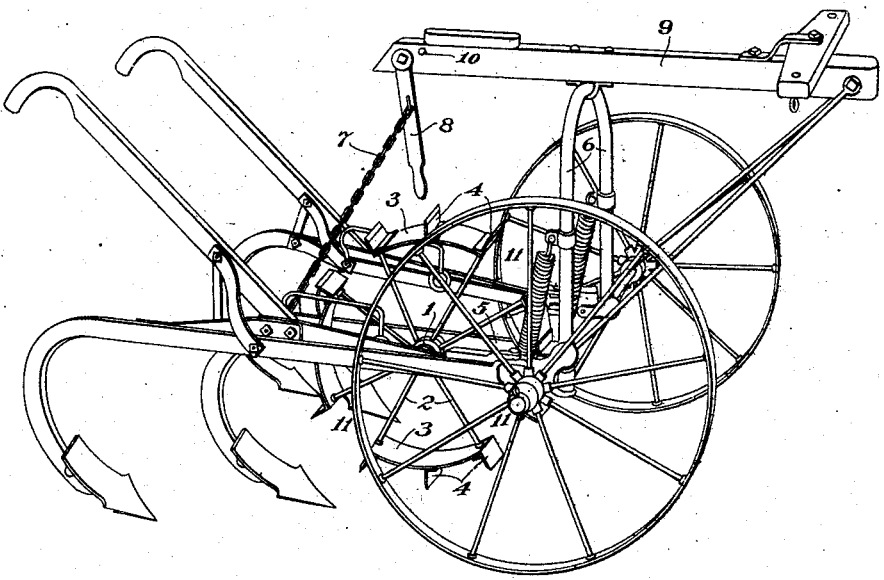
Figure 2:
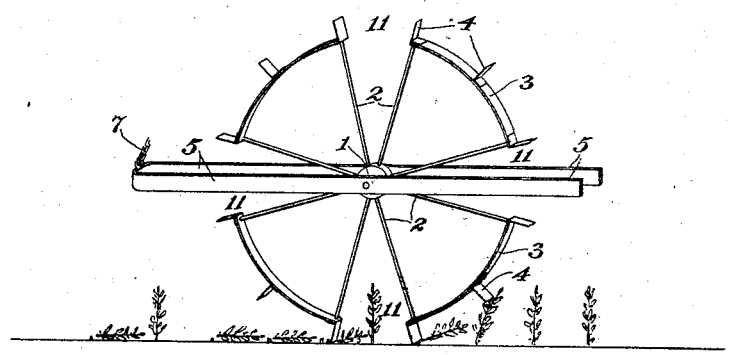

Referring to the drawings, forming a part of this specification, Figure 1 is a perspective view of the improved cotton chopper as applied to an ordinary cultivator. Fig. 2, a perspective view of the improved cotton chopper detached from the cultivator and illustrating its actions upon the cotton stalks.

Similar numerals of reference designate like parts throughout all the figures of the drawings.

The improved cotton chopper comprises a chopping wheel consisting of a suitable wheel body, such for example, as a wheel hub 1, provided with spoke members 2, carrying a plurality of rim sections 3, preferably of substantial width as shown and provided or armed with a plurality of radially extending transversely arranged chopping blades or cutters 4.

As a means for mounting and carrying the chopping wheel in proper position, said chopping wheel is carried by a supporting beam or double armed chopping wheel carrying member 5, adapted to be pivotally secured at its front end to a suitable wheeled vehicle, as for example, to the lower portion of the cultivator arch member 6, as shown in Fig. 1, of the drawings.

As a means for lowering and raising the supporting beam member 5, whereby the chopping wheel may be carried from and to its operative position, the rear or free end of the carrying member 5, is provided with a chain 7, connected to a hand lever 8, said hand lever 8, being connected, in the present instance, to the rear tongue member or frame 9, of the cultivator so that by swinging said hand lever 8, to an opposite or reversed position to that shown in Fig. 1, the beam member 5, together with the chopping wheel will be elevated in an obvious manner, the stop or pin member 10, limiting and serving to hold the hand lever 8, in its elevated position.

The rim sections 3, are spaced from each other so as to provide cotton stalk receiving recesses or openings 11, adapted to receive certain of the stalks and the rim sections and chopping blades or cutters are adapted to press down and cut upon the ground the intermediate cotton stalks as indicated. Any desired number of chopping blades or cutters 4, may be provided, it being obvious that the rim sections are adapted to press down certain of the cotton stalks while the blades or cutters are adapted to cut said stalks by pressing and cutting same upon the ground as indicated.

From the foregoing description, taken in connection with the accompanying drawings, the operation and advantages of my invention will be readily understood.

Having thus described an embodiment of my invention, what I claim and desire to secure by Letters Patent is,—

In a cotton chopper and cultivator, in combination, a cultivator arch having its side members provided with wheels and cultivators extending rearwardly therefrom, a tongue member secured to and extending horizontally above and to the rear of the upper portion of said arch member, a chopping wheel, extending between said cultivators, a hand-lever pivotally secured to the rear of said tongue member and normally depending therefrom, a chain member secured to said chopping wheel and connected to said hand-lever intermediate the pivoted and free ends thereof, and a stop pin on said tongue member in front of the pivoted portion of said hand-lever for holding said hand-lever in an elevated position whereby said chopping wheel may be supported in an elevated position, independently of said cultivators, when raised to a predetermined height.

In testimony whereof I have affixed my signature, in presence of two witnesses.

FRED SIEGLINGER.

Witnesses:
L. S. LAWRENCE,
WM. F. JOHANNABER.

Copies of this patent may be obtained for five cents each, by addressing the "Commissioner of Patents, Washington, D. C."